Nov. 5, 1940.   R. R. ROEMER   2,220,284
WHEEL AND METHOD OF MAKING IT
Filed April 30, 1938   4 Sheets-Sheet 2

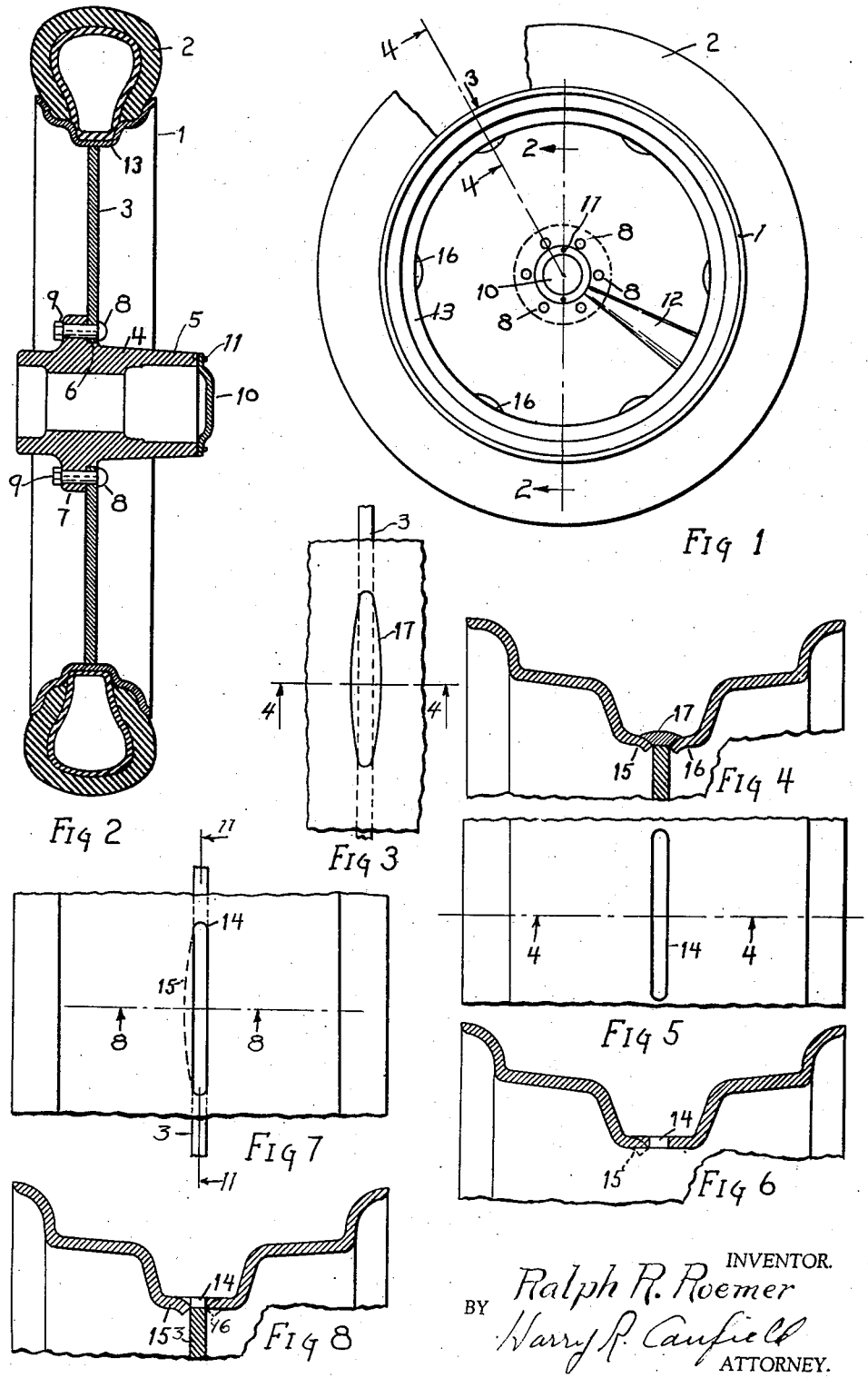

INVENTOR.
Ralph R. Roemer
BY Harry P. Canfield
ATTORNEY.

Nov. 5, 1940.                R. R. ROEMER                2,220,284
                       WHEEL AND METHOD OF MAKING IT
                         Filed April 30, 1938           4 Sheets-Sheet 3
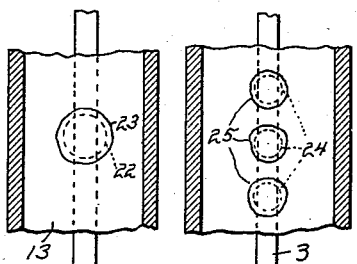
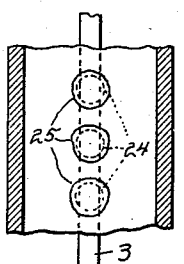
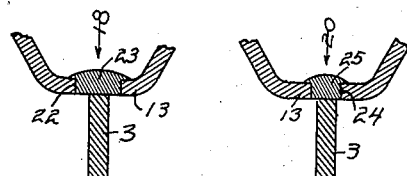
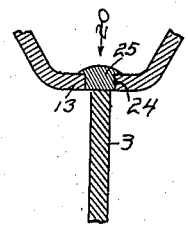
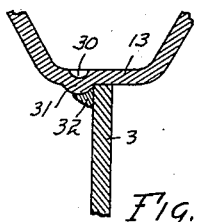
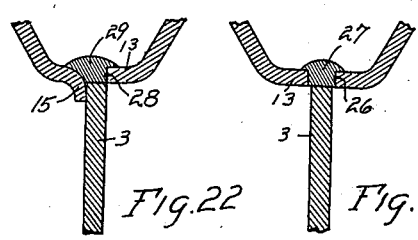
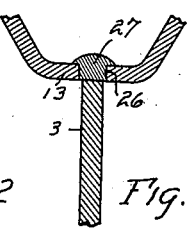
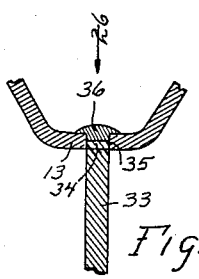
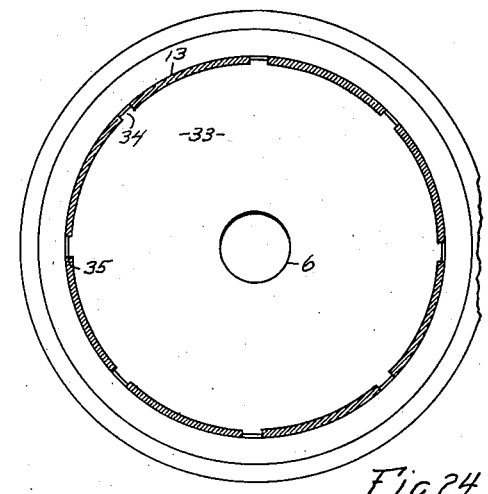
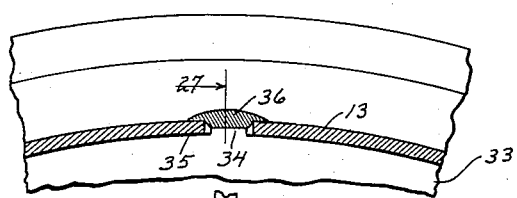
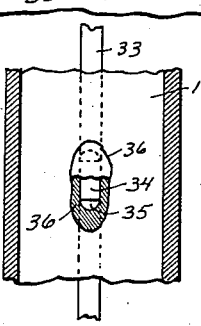
INVENTOR.
Ralph R. Roemer
Harry R. Canfield
BY
ATTORNEY.

Nov. 5, 1940.  R. R. ROEMER  2,220,284
WHEEL AND METHOD OF MAKING IT
Filed April 30, 1938  4 Sheets-Sheet 4

INVENTOR.
Ralph R. Roemer
BY Harry P. Canfield
ATTORNEY.

Patented Nov. 5, 1940

2,220,284

UNITED STATES PATENT OFFICE 2,220,284

WHEEL AND METHOD OF MAKING IT

Ralph R. Roemer, Cleveland, Ohio

Application April 30, 1938, Serial No. 205,289

7 Claims. (Cl. 29—159.01)

This invention relates to wheels, particularly to wheels of the vehicle type and to methods of making the same.

It is becoming more and more the practice to equip the wheels of vehicles of the class of wheelbarrows, concrete carts, trailers, etc., with pneumatic tires, and the problem has arisen of making a pneumatic tired wheel for such uses which will be sufficiently cheap to manufacture and assemble as not to unduly increase the cost of the vehicle using the wheels.

While my invention, as will appear hereafter, may, in many of its aspects, be applied to other types of wheels, it is illustrated herein as applied to pneumatically tired wheels.

Among the objects of the invention are:

To provide an improved vehicle wheel and a method of making it;

To provide an improved wheel of the disc type and a method of making it;

To provide an improved method and means for mounting a wheel disc in a wheel of the disc-center type;

To provide an improved means and method for assembling the rim, disc and bearing of a disc type wheel;

To provide a disc-center wheel having an improved rim construction;

To provide a wheel having an improved disc center element;

To provide a wheel having an improved bearing construction.

Other objects will be apparent to those skilled in the art to which my invention appertains.

My invention is fully disclosed in the following description taken in connection with the accompanying drawings in which:

Fig. 1 is a side elevational view with parts broken away, of a wheel embodying my invention;

Fig. 2 is a longitudinal sectional view taken from the plane 2—2 of Fig. 1 and drawn to a larger scale;

Figures 9, 10:
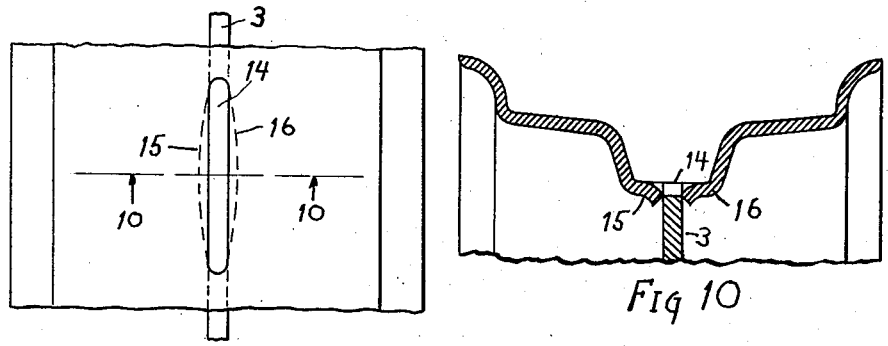
Figures 11, 12:
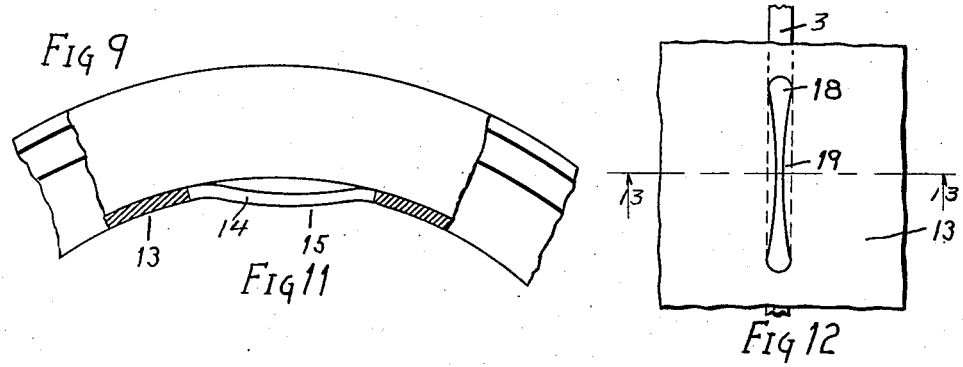
Figures 13, 14:
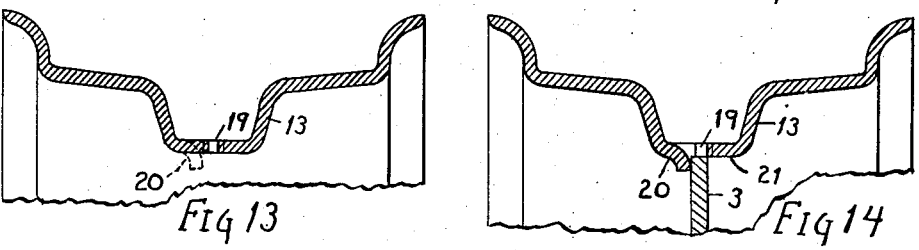
Figures 15, 16:
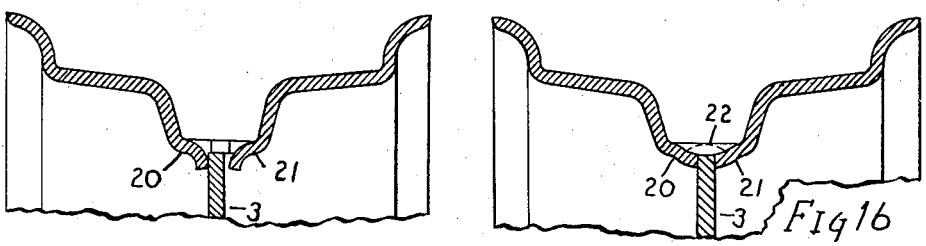

Figs. 3 and 4 are fragmentary views taken respectively in the direction of the arrow 3 and from the sectional plane 4—4 of Fig. 1, illustrating part of the method of making the wheel, and illustrating the finished appearance of the wheel at one of a plurality such as six like points around the wheel;

Figs. 5 and 6 are respectively views generally similar to Figs. 3 and 4 but illustrating one of the first steps of the process of making the wheel;

Figs. 7 and 8 are views illustrating another step of the process;

Figs. 9 and 10 are views illustrating still another step of the process;

Fig. 11 is a longitudinal sectional view taken from the plane 11—11 of Fig. 7 but with a disc portion of that figure omitted and further illustrating the step of process of Fig. 7;

Figs. 12 and 13 are views similar to Figs. 5 and 6, illustrating the corresponding method steps of making a wheel by a modification of the process illustrated in Figs. 5 and 6;

Figs. 14, 15 and 16 illustrate further steps of the modification process, Fig. 16 illustrating the last step of the process in its preferred form.

Figure 28:
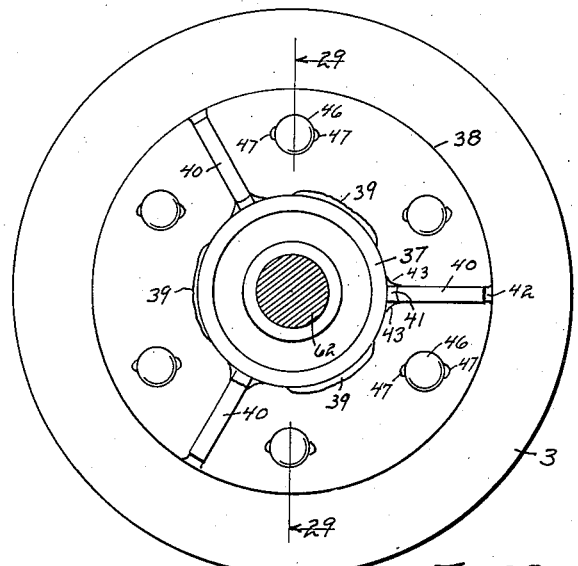
Figure 29:
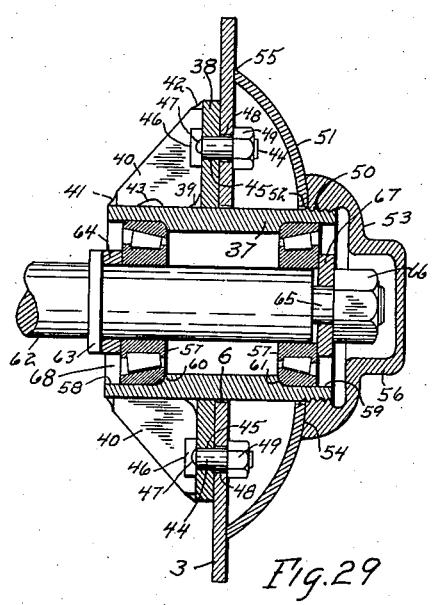
Figure 30:
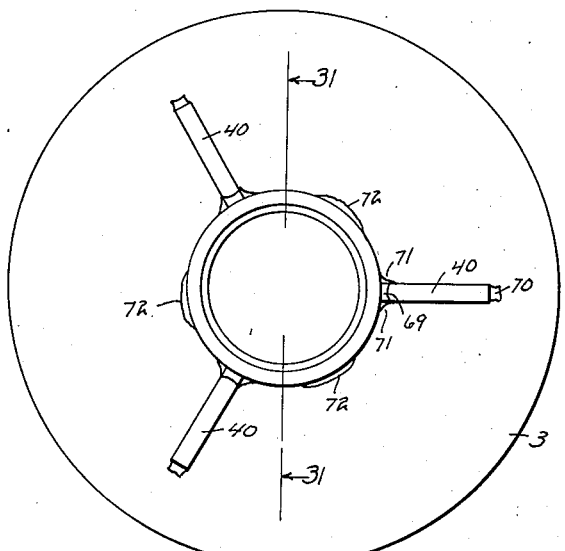
Figure 31:
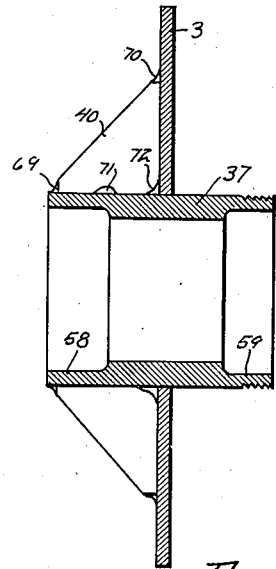

Fig. 17 is a fragmentary sectional view, and Fig. 18 is a view taken in the direction of the arrow 18 of Fig. 17, the two figures corresponding to Figs. 4 and 3 respectively, but illustrating another modification;

Fig. 19 is a sectional view, and Fig. 20 is a view taken from the direction of the arrow 20 of Fig. 19, the views corresponding to Figs. 4 and 3 respectively and illustrating another modification;

Figs. 21, 22 and 23 are views similar to Fig. 4 but illustrating still further modifications;

Fig. 24 is a view illustrating a wheel rim associated with another form of disc which I may employ in the practice of my invention;

Fig. 25 is a fragmentary view similar to a part of Fig. 24 to a larger scale, and showing additionally, welding material;

Fig. 26 is a view taken in the direction of the arrow 26 of Fig. 27, with welding material broken away;

Fig. 27 is a fragmentary sectional view taken from the plane 27 of Fig. 25;

Fig. 28 is a front elevational view of a disc which I may employ in a wheel in the practice of my invention with another form of bearing hub detachably mounted thereon;

Fig. 29 is a sectional view taken from the plane 29—29 of Fig. 28;

Fig. 30 is a view similar to Fig. 28 but illustrating a hub integrally mounted on the disc;

Fig. 31 is a view taken from plane 31—31 of Fig. 30.

Referring to the drawings, Figs. 1 and 2, the wheel in the preferred embodiment comprises a rim 1 which may be the well-known drop-center type of pneumatic tire rim such as is used on the wheels of automotive vehicles. At 2 is a pneumatic tire mounted in the rim in the usual manner. The wheel is of the center disc type, and at 3 is the center disc. At 4 is a hub at the center of the wheel disc preferably formed to receive a ball-bearing, roller bearing or other anti-friction bearing by which the wheel may be mounted upon an axle or the like of the vehicle.

The hub 4 comprises a shank portion 5 which is projected through a center perforation 6 in the disc 3 and comprises a flange 7 overlapping the perforation. The hub 4 is secured to the disc, by a plurality such as six, bolts, projected through aligned perforations in the flange 7 and in the disc 3 outwardly of the central perforation 6, and both being secured by nuts 9—9 on the face of the disc opposite the flange 7.

The shank 5, in the preferred manner of mounting the wheel on a vehicle, projects outwardly laterally from the vehicle and therefore it is preferred to cover it with a cap 10 secured by screws 11—11 projected through the cap and threaded into the outer end of the hollow shank 5.

The disc 3 is preferably formed from sheet metal and is simply a circular disc with the said hub perforations at the center thereof.

If the disc is formed by dies in a press type machine, the face of the disc may be provided with ribs or the like press formed therein, one of which is indicated at 12 in Fig. 1.

It is, however, one of the advantages of my invention that the disc 3 may be simply a flat disc having a circular periphery with the perforation 6 at the center; and such a disc may be cut out of sheet metal by rotary shears or by straight shears in which latter case the periphery instead of being circular would be polygonal. The roughly cut disc thus made may be placed in a lathe and turned to a true circle; the total cost of making the disc in this manner without dies is so low that even making them a few at a time is not prohibitively expensive.

To mount the disc 3 in the rim 1, the following process is preferably followed. At a number of equally spaced points around the rim, such for example as 6 points, the rim, at the drop center portion 13 thereof, has perforations punched therein which are preferably formed as shown for one of them at 14 in Fig. 5. The width of the perforation 14 is preferably approximately equal to the thickness of the disc 3 and a satisfactory longitudinal dimension therefor is 2 inches circumferentially. All of the perforations 14 are on a circle of the rim and in a rotational plane thereof.

The perforations 14 having been made, one of the side edges of each of the perforations is deformed inwardly to form a lip as shown at 15, Figs. 7 and 8, and in side view, in Fig. 11. A plurality or circle of lips 15, such for example as six in number, are thus provided on the rim.

The next step of the method is to lay the disc 3 within the rim 1 and upon the said circle of lips, the rim 3 at one point being shown in contact with the lip 15 in Fig. 8.

The opposite side of the perforations 14—14 are then deformed inwardly to provide a circle of lips 16—16 respectively opposite the lips 15—15 as shown in Figs. 9 and 10. The disc 3 is now trapped in the rim between the opposite lips 15—16, disposed in pairs as described around the inside of the rim.

The next step is to weld the rim to the disc and this is done as shown in Figs. 3 and 4, welding material 17 being applied to substantially fill the perforation 14 and the depression therein formed by depressing the deforations or lips 15 or 16, and joining the lips to each other and to the edges of the disc adjacent thereto. This welding operation is performed at each of the six points around the wheel.

When the wheel is finished, and the tire has been placed on the rim, all that remains visible of the juncture of the rim and the periphery of the disc, are the lips 16—16 on one side of the wheel and the lips 15—15 on the other side and these lips being of only slight elevation inwardly on the drop center portion 13 of the rim, the wheel has a very neat appearance.

When the modification of the method illustrated in Figs. 12 to 16 is practiced, the perforations made in the rim are given a shape somewhat as shown at 18 in Fig. 12, that is to say, at the longitudinal middle of the perforation, as at 19, the perforation is very narrow and at the ends thereof is of substantially the same width as the thickness of the disc, as shown in Fig. 12.

The first step is to depress a lip at one side of the perforation 18 as shown at 20, in Fig. 13.

This lip is also shown in solid line in Fig. 14 and it will be observed that it extends farther inwardly radially from the drop center 13 of the rim than did the corresponding lip 15 in the first process. The next step is to lay the disc 3 against the circle of lips 20—20, and because of the great degree to which the lip 20 is bent, the edge of the disc will be disposed so far under the perforation 18 that the other side of the perforation may be bent downwardly into a lip 21, and as it is bent downwardly will clear the edge of the disc 3. The lip 20 is shown in Fig. 15 with the disc 3 now trapped between it and the lip 20.

The next operation is to press the lips back outwardly again to the position illustrated in Fig. 16. In their normal position, as was described in connection with Fig. 12, the material constituting these lips 20 and 21 was very close together, being spaced apart only by the very narrow portion 19 of the perforation; so that now when the lips are pressed outwardly they tend to approach their original position and their inner edges tend to move closely toward each other and therefore may rigidly grip the disc edge portion therebetween as shown in Fig. 16.

Therefore when a slot such as 18 is employed and the disc is assembled with the rim by the process just described, it is not, in every case, necessary to weld the lips and the disc together. However, welding is preferred and the rim, disc and lips may be welded as described in connection with Figs. 3 and 4. Such welding being indicated in dotted lines in Fig. 16 at 22.

In Figs. 17 and 18 is illustrated a modification in which the lips are not employed. Here the drop center portion 13 of the rim has a circular perforation 22 formed therein a plurality of these perforations, such as six, being provided at spaced points around the rim as were the perforations 14 of the other form described above. The disc 3 is then placed in the rim with the perforations 22 opposite the peripheral edge of the rim. The perforations 22 are preferably considerably greater in diameter than the thickness of the disc 3. The disc is then rigidly secured to the rim by welding it thereto, the welding material being shown at 23 and rigidly connecting the rim to the disc, and, as in the other modifications described, this welding material is all on the radially outer portion of the rim and therefore covered and rendered invisible by the tire when it is placed on the rim.

In the modifications of Figs. 19 and 20, instead of a single relatively large perforation 22, as in Figs. 17 and 18, a group of smaller perforations 24—24 is provided in groups, such for example as three to the group, at spaced points around the rim, and the rim is rigidly secured to the disc by the welding material shown at 25, filling the perforations and securing the disc to the rim.

In the modification of Fig. 21, a perforation such as that at 14 in Fig. 5 (or that of 19 in Fig. 12) is employed, but the edges of the perforation are not bent downwardly to provide lips. This perforation is shown at 26 in Fig. 21 and the disc is welded to the rim by welding material shown at 27, this construction being generally similar to that of the forms of Figs. 18 and 20, except for the shape of the perforation.

In Fig. 22 is shown a modification in which one lip is provided. Perforations 28 are made at spaced points around the rim, and they may be like the perforation 14 of Fig. 5, and one side edge of the perforation is bent downwardly to provide the lip 15, as shown in Figs. 7 and 8. The disc 3 is then placed against the series of lips 15—15 and welding material 29 is filled in, welding the lip and the drop center portion of the rim and the disc 3 all rigidly together. This form may be considered similar to the form of Figs. 17 to 21, but with one series of lips provided to position the disc.

In the modification of Fig. 23, a depression 30 is made inwardly radially at spaced points around the drop center portion 13 of the rim, providing inwardly radially extending lugs 31 and the rim 3 is first placed against the lug 31 to position it and welding material at 32 is filled in between the lugs 31 and the disc 3 in the pocket or corner between the two to rigidly secure the disc to the rim.

In the modification of Figs. 24 to 27 inclusive, a disc 33 is provided having on the periphery, at spaced points such as eight points around the periphery, outwardly radially extending short tongues 34—34. The drop center portion 13 of the rim is perforated at corresponding points, providing perforations 35—35 which are approximately of the same size as the tongues 34. The disc is then forcibly pressed into the rim and the tongues 34 snap out into the perforations 35—35. Welding material 36 is then applied rigidly welding the tongues 34 to the rim 13, the welding material being on the radially outer portion of the drop center portions 13 of the rim and therefore rendered invisible when the tire is put in place.

It will be seen from the foregoing that the center disc and the rim are integrally welded together and in some cases it will be highly desirable that the bearing hub of such a wheel be likewise of welded construction, for cheapness, durability, neatness and rigidity, and such a hub construction for any of the center disc wheels made by the processes or modifications thereof of the foregoing, are shown in Figs. 28 and 29.

The disc 3 has the central perforation 6 of the wheel of Figs. 1 and 2 or that of Fig. 24, through which the hub, to be described, is projected. In the form of Figs. 28 and 29, the hub is demountable from the disc or vice versa. The hub comprises a tube 37 projected through a central perforation in a circular flange 38 and rigidly welded thereto by welding material shown at 39, at spaced points, such as three points around the tube 37. A plurality, such as three gussets 40—40 of triangular form, are placed between the inner end portion of the hub tube 37 and the flange 38 and rigidly welded thereto, for example as at 41, 42 and 43. The tube 37, flange 38 and gussets 40—40 are thus made of integral construction. A plurality, such as six bolts 44, are projected through a circular series of perforations 45 in the flange 38 co-axial with the tube 37 and are rigidly secured in the perforations by welding the heads 46 of the bolts to the inner face of the flange 38 as shown at 47—47.

The disc 3 is provided with a circular series of perforations 48—48 through which the threaded ends of the bolts 44 are projected and when nuts 49—49 are threaded on the bolts, the integral hub and flange assembly is detachably mounted thereon.

The outer end portion of the hub and the nuts 49 and bolts 44 may be covered and sealed and rendered neat in appearance by the following arrangement. The outer end portion of the tube 37 is threaded at 50. A cup form cover 51 which may be either a casting or a sheet metal stamping is provided with a large central perforation 52 whereby it is telescoped over the threaded end of the tube 37. A cap 53 is internally threaded and screwed on the threads 50 and sealingly engages the cover 51 at 54, and presses the periphery 55 of the cover against the disc, effecting a seal thereat. The cap 53 may be provided with a hexagonal or other polygonal form at 56 by which it may be screwed on or off by a wrench.

Any suitable bearing may be provided in the tube 37. The one illustrated comprises conventional tapered roller bearings 57—57, illustrated somewhat diagrammatically in Fig. 29, the outer races of which are pressed into inner and outer bored portions 58 and 59 in the tube and seated against shoulders 60 and 61. The shaft 62 upon which the wheel is to rotate has a collar 63 thereon inwardly of which is a washer 64 pressing against the inner raceway of the inner bearing. The shaft extends through the inner raceways of the bearings and at its outer end has a threaded shank 65 for receiving a nut 66, a washer 67 being interposed between the nut and the inner raceway of the outer bearing. The nut 66 may be locked in any rotated position by any suitable well known means to suitably adjust the freedom of the bearings. The inner end of the tube 37 may be sealed by any well known bearing seal in the space 68, which, being conventional, is not illustrated.

In Figs. 30 and 31 is illustrated a simpler construction of bearing hub. In this form, the gussets 40—40 are welded, not to a flange as in the form of Figs. 28 and 29, but directly to the disc 3 by welding material at 69, 70 and 71, and the tube 37 is welded directly to the disc 3, by welding material at 72.

In either of the forms, Figs. 28 and 29 or 30 and 31, by welding the tube 37 to the flange 38 or to the disc 3 at spaced points, such as three, as illustrated and described, liability that the tube 37 will be distorted by the heat of welding is avoided or rendered negligible. However, in forming the bores 58 and 59 for the bearings 57, they may be reamed out after the welding is finished and thereby made accurately co-axial and concentric with the periphery of the disc 3 and therefore concentric with the rim (not shown) to which the disc is secured by any of the methods described above.

As will now be apparent, the rim 1 need not necessarily be a pneumatic tire receiving rim, but may be any type of rim having a portion corresponding to the portion 13, although my invention may be employed to its greatest advantage where the rim is a tire receiving rim.

My invention is not limited in all respects to the exact details of construction or steps of method illustrated and described. Changes and modifications may be made within the scope and spirit of my invention without sacrificing its advantages and within the scope of the appended claims.

I claim:

1. The method of mounting a sheet metal wheel disc in a sheet metal rim which includes perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent to the other face of the disc.

2. The method of mounting a sheet metal wheel disc in a sheet metal wheel rim which includes perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent the other face of the disc, and then welding together adjacent portions of the lips and the disc.

3. The method of mounting a sheet metal wheel disc in a sheet metal rim which includes perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent the other face of the disc, and forcibly bending the lips outwardly to rigidly clamp the peripheral portions of the disc therebetween.

4. The method of making a wheel which includes forming a sheet metal disc, forming a sheet metal rim, perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent the other face of the disc.

5. The method of making a wheel which includes forming a sheet metal disc, forming a sheet metal rim, perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent the other face of the disc, and then welding together adjacent portions of the lips and the disc.

6. The method of making a wheel which includes forming a sheet metal disc, forming a sheet metal rim, perforating the rim at circularly spaced portions, bending inwardly one side of each perforation to provide a circumferential series of inwardly extending lips on the rim, placing the disc within the rim and with one side of the disc at peripheral portions thereof adjacent to the said lips, bending the other side of the perforations inwardly to provide a circular series of inwardly extending lips adjacent the other face of the disc, and forcibly bending the lips outwardly to rigidly clamp the peripheral portions therebetween.

7. A wheel comprising a metal rim, a center disc rigidly integrally joined with the rim, a unitary detachable wheel hub comprising a hub tube projected through a central perforation of the disc, a flange surrounding the tube, circumferentially spaced gussets welded to outer portions of the hub tube and to the flange rigidly disposing the flange at right angles to the tube, bolts welded to the flange and projected through perforations in the disc and nuts on the bolts beyond the disc to detachably secure the unitary hub to the disc.

RALPH R. ROEMER.